R. D. GASTON.
TRUCK ATTACHMENT FOR AUTOMOBILES.
APPLICATION FILED JULY 26, 1916.

1,236,286.

Patented Aug. 7, 1917.
2 SHEETS—SHEET 1.

WITNESSES:
Howard D. Orr.
J. T. Mawhinney

R. D. Gaston, INVENTOR,
BY E. G. Siggers
Attorney

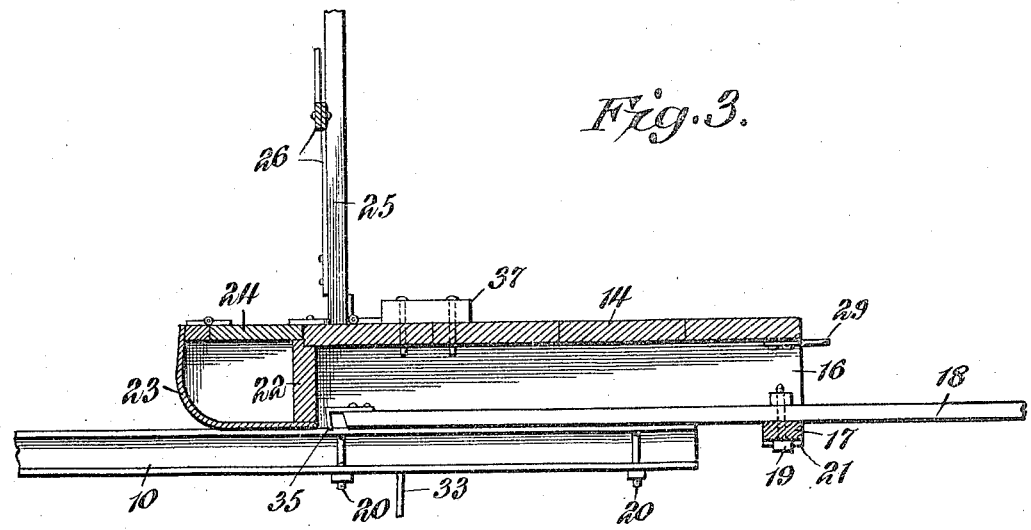

UNITED STATES PATENT OFFICE.

ROSCOE D. GASTON, OF HASTINGS, NEBRASKA.

TRUCK ATTACHMENT FOR AUTOMOBILES.

1,236,286.  Specification of Letters Patent.  Patented Aug. 7, 1917.

Application filed July 26, 1916. Serial No. 111,454.

*To all whom it may concern:*

Be it known that I, ROSCOE D. GASTON, a citizen of the United States, residing at Hastings, in the county of Adams and State of Nebraska, have invented a new and useful Truck Attachment for Automobiles, of which the following is a specification.

The present invention relates to automobiles, and has particular reference to a truck attachment for automobiles, to adapt the latter to carry heavy merchandise, such as pianos.

The object of the present invention is to provide a light, strong and economically constructed attachment to be applied particularly to that type of automobile known as the "Ford", the attachment being adapted to be detachably secured upon the rear end of the vehicle, so as to carry a piano, and to properly distribute the weight of the piano on the rear end of the vehicle.

In carrying out the above set forth object, the present invention provides a platform adapted to take the place of the tonneau, or the compartment usually mounted on the rear end of an automobile, and to provide the platform with means for rigidly securing and supporting a piano upon the vehicle.

The invention will be best understood from a consideration of the following detailed description, taken in connection with the accompanying drawings, forming part of this specification, with the further understanding that while the drawings show a practical form of the invention, the latter is not confined to strict conformity with the showing of the drawings, but may be changed and modified, so long as such changes and modifications come within the scope of the appended claims.

In the drawings:—

Fig. 3 is a central longitudinal section, taken vertically through the attachment, showing one of the side bars of the automobile frame.

Fig. 4 is a detail perspective view of the attachment of this invention, the full lines showing the back in raised position, and the dotted lines showing the same when folded down.

Fig. 5 is a detail sectional view of one side of the platform, showing the skid as applied to the same to admit of the easy placing and removal of the piano.

Figure 1:
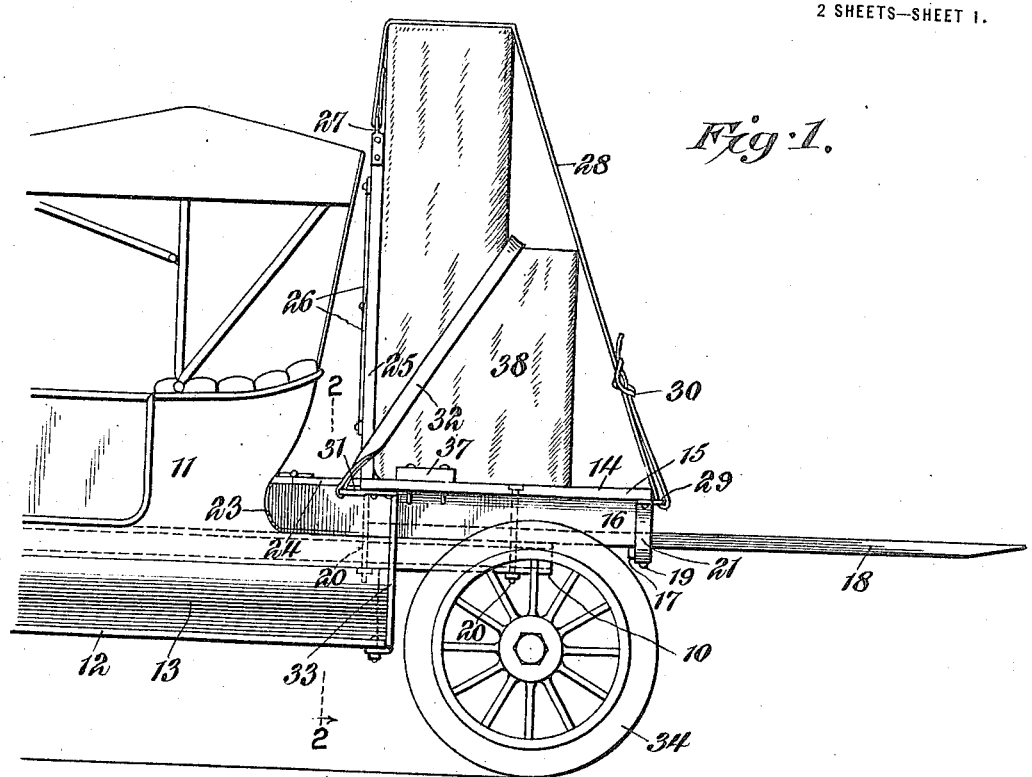
Figure 1 is a side elevation of the rear end of an automobile having the improved truck attachment applied thereto.

In the present embodiment of the invention, the same is disclosed as being applied to an automobile of the "Ford" type. The automobile is disclosed as having a pair of side frame bars 10 supporting a body 11, the usual running board 12, and the running board shield 13.

The attachment comprises a platform 14, which may be made up of a plurality of parts or sections, which extend transversely across the vehicle when in position, and which are preferably reinforced and connected together by angle irons 15, the latter being secured over the opposite lateral edges of the platform. Longitudinally extending beams 16 are arranged beneath the platform 14, are spaced apart, and are adapted to register with, and seat upon, the upper edges of the side bars 10 of the vehicle frame. A cross piece 17 is secured preferably across the lower edges of the beams 16 and provides, between the latter and the platform 14, a space or chamber into which may be inserted one end of a skid 18, the latter being held in place during the travel of the vehicle by a bolt 19, or the like.

As shown in Fig. 1, the rear end of the body 11 is removed from the vehicle, and the beams 16 are fitted upon the bars 10 in lieu of the usual body frame. The forward ends of the beams 16 are preferably rounded to conform to that portion of the body 11, which is retained on the vehicle. Bolts 20 are carried by the beams 16 and project downwardly through the side bars 10, the bolts being adapted to receive clamping nuts, as shown, to hold the platform rigidly upon the side bars 10. Reinforcing straps 21 may be used, the same being secured at opposite ends to the lateral edges of the platform 14, preferably at the rear end thereof, and extending downwardly beneath the cross piece 17, and the beams 16 to hold the latter from lateral displacement beneath the platform.

As shown in Fig. 3, the beams 16 may be provided near their forward ends with a partition 22, and a curved wall or plate 23 to provide a storage compartment, or the like, to which access may be had, and which may be closed by a hinged lid or cover 24. This storage compartment, as shown in Fig. 1, is of such a size as to fill in a space immediately behind the seat of the body 11, and space the platform 14 to the desired extent in rear of said body seat.

The platform 14 carries, preferably adjacent to its forward edge, a pair of uprights 25 hinged at their lower ends to the platform, as shown to advantage in Fig. 4, and being adapted to be folded down on top of the platform when the device is not in use. These uprights 25 are reinforced by a pair of crossed braces 26, the same joining the uprights and forming therewith a support and securing means for the piano. The uprights 25 are provided with loops or eyes 27, through which straps 28 may be passed, the straps 28 being adjustably connected to loops 29, mounted on the rear of the platform, by means of buckles 30.

The forward end of the platform 14 has, near its opposite sides, loops or eyes 31 adapted to receive therein the opposite ends of a strap 32, the same being preferably looped upwardly over the platform. These loops extend forwardly beyond the uprights.

Fenders 33 depend from the forward end of the platform 14, near the lateral edges thereof, and immediately in front of the rear wheels 34 of the vehicle.

These fenders 33 take the place of the usual rear fenders of the automobile, and are flanged and curved at their inner lower corners to conform to the curvature of the running board shields 13, and are secured at their lower ends to the rear extremities of the running boards 12. Thus, the body 11 is fully protected from dust, mud, and the like, during the travel of the vehicle.

The skid 18 is provided with one or more hooks 35, as shown in Fig. 5, adapted to engage in slots or openings 36 formed in the angle irons 15 to support the skid at either side of the platform for the purpose of placing or removing the piano or other heavy article upon or from the device.

A block 37 is adjustably mounted on each side of the platform 14, for engagement with the opposite ends of a piano, or the like when placed on the platform, to hold the piano from lateral shifting, when the vehicle is in motion.

Figure 2:
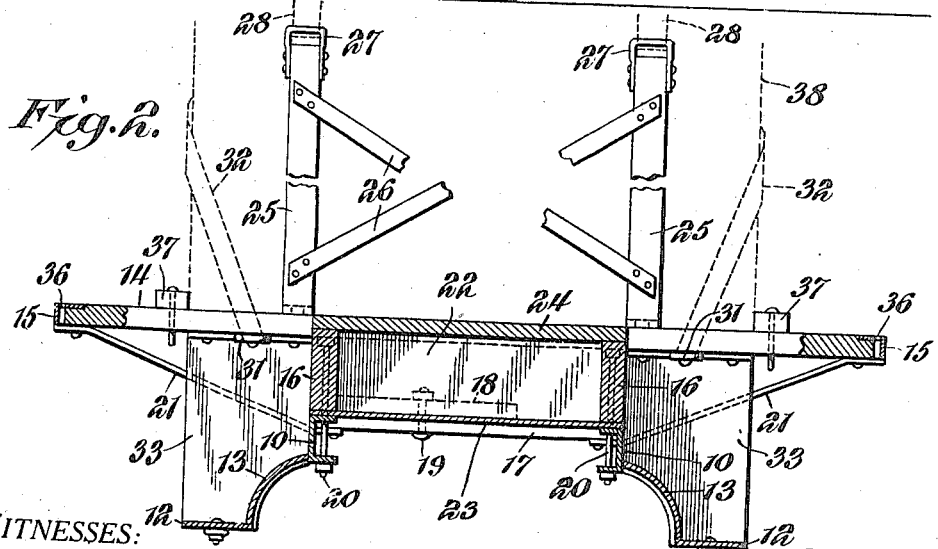
Fig. 2 is a front end elevation of the attachment as applied to the frame of an automobile, the automobile being shown in section on the line 2—2 of Fig. 1, and being partly broken away, parts of the attachment also being shown in section, and the piano and straps being shown in dotted lines.

As shown in Fig. 1, a piano 38 is mounted on the platform 14. The back of the piano is fitted closely up against the uprights of the platform, and the straps 28 are looped upwardly over the top of the piano 38, and are carried downwardly to the loops or eyes 29 of the platform. By means of the buckles 30, the straps 28 may be drawn taut, so as to hold the piano from tipping from the platform. The strap 32 is looped across the front of the piano and down the opposite sides thereof, the front eyes or loops 31 of the platform being spaced apart a distance less than the length of the piano 38, as shown in dotted lines in Fig. 2, to cause the strap 32 to lap around the opposite ends of the piano and retain it from lateral displacement from the platform.

What is claimed is:—

1. A truck attachment for automobiles comprising a pair of vertically arranged longitudinally extending spaced apart beams, the lower edges of which are adapted to rest upon the rear end of the frame of the automobile in rear of the seat and in lieu of the rear end of the body of the latter, a platform mounted upon the upper edges of said beams and extending at each side beyond the same, said beams extending beyond the front end of the platform, so as to fit against that portion of the body retained on the automobile, and means for detachably securing the platform and beams to the frame of the automobile.

2. A truck attachment for automobiles comprising a pair of vertically arranged longitudinally extending spaced beams arranged to rest directly upon the side bars of the frame of the automobile with their lower edges in engagement therewith, a platform mounted upon the upper edges of said beams and extending at each side beyond the same, means for detachably securing said platform and beams to said side bars, a vertically disposed upright mounted upon the front end of the platform, and means connected to the platform and upright for retaining a piano upon the platform and against the upright.

3. The combination with an automobile having side bars and rear wheels, of an attachment adapted to rest upon the rear end of the frame of the automobile in rear of the seat and in lieu of the rear end of the body of the latter and comprising vertically arranged longitudinally extending beams resting upon the side bars of the automobile and projecting above said wheels, a platform mounted upon said beams and extending at each side thereof beyond the same and over the wheels, means for detachably securing said platform and beams to said side bars, an upright fastened to the forward end of said platform in front of said wheels, and means attached to the upright and platform for securing a piano upon the platform and against the upright.

4. The combination with a motor vehicle having rear wheels and side bars, of a truck attachment comprising a platform, vertically arranged longitudinally extending spaced apart beams secured to and arranged beneath the platform and resting upon the side bars of the vehicle frame in rear of the seat, said platform extending at each side beyond the beams and over the wheels, the front ends of said beams being extended beyond the platform and fitted against the body portion of the vehicle, a vertically disposed upright mounted upon the front end of said platform in front of said wheels and adapted to receive articles thereagainst, and means for detachably and rigidly securing said beams to the side bars of the vehicle frame.

5. A truck attachment for automobiles comprising a platform adapted to seat upon the rear end of the frame of the automobile, means for detachably securing the platform to the frame, uprights at the inner end of said platform and extending upwardly therefrom, loops provided at the upper ends of the uprights and at the outer end of the platform, and other loops provided on the inner end of the platform on each side of the uprights, said loops being adapted to receive straps in fastening upon the platform the articles carried thereby.

6. A truck attachment for automobiles comprising a platform adapted to seat upon the rear end of the frame of the automobile, means for detachably securing the platform to the frame, uprights at the inner end of said platform and extending upwardly therefrom, loops provided at the upper ends of the uprights, and at the outer end of the platform, and other loops provided on the inner end of the platform on each side of the uprights, said loops being adapted to receive straps in fastening upon the platform the articles carried thereby, said uprights being hinged to the platform so that they may be swung down upon the same when not in use.

7. A truck attachment for automobiles comprising a platform, uprights mounted upon the forward end of the platform, a pair of longitudinally extending beams carried beneath the platform and adapted to seat upon the side bars of the frame of an automobile, a cross piece secured across the lower portions of the beams and providing a space between the cross piece and the platform, a skid adapted for insertion in said space, means for detachably securing the beams to said side bars, and a plurality of straps carried upon the platform and upon said uprights for engagement about articles placed on the platform to hold the articles thereon and against said uprights.

8. In combination with an automobile having a frame, running boards, running board shields, a platform arranged behind said body, beams supporting the platform and adapted to seat edgewise upon the side bars of said frame, and having their forward ends bearing against the adjacent part of said body, means for detachably securing the beams to said frame, uprights mounted upon the forward edge of said platform and being adapted to receive articles thereagainst, means carried by the platform and the uprights for holding the articles from displacement, and fenders depending from the opposite sides of said platform and conforming at their lower ends to said running boards and said running board shields.

9. In combination with a motor vehicle, a platform, beams arranged beneath the platform for supporting it and adapted to rest upon the frame of said vehicle, means for detachably securing the beams to said frame, foldable uprights mounted upon the forward end of said platform and adapted to be swung upwardly therefrom, said beams extending forwardly from the platform and from said uprights and having their forward extremities fitting against the body portion of the vehicle, a partition arranged between the beams, a plate carried by the beams and forming therebetween and with the partition a compartment, a cover supported on the beams for closing the compartment, and a plurality of straps carried by said uprights and said platform for engagement with articles on the platform to hold the same against the uprights.

10. In combination with an automobile having a frame, running boards and running board shields, of a platform arranged behind said body, beams supporting the platform and adapted to seat edgewise upon the side bars of said frame and having their forward ends bearing against the adjacent part of said body, means for detachably securing the beams to said frame, and fenders depending from the opposite sides of said platform and conforming at their lower ends to said running boards and said running board shields.

11. The combination with a motor vehicle, of an attachment adapted to rest upon the rear end of the frame of the vehicle in rear of the seat and in lieu of the rear end of the body of the vehicle, comprising a platform, beams on which said platform is supported, means for securing said beams to the frame of the vehicle so as to support said platform above the plane of the rear wheels, said platform being extended at each side thereof beyond the frame and over the rear wheels, and an upright fastened to the forward end of said platform in front of said wheels, said beams being extended at their inner ends beyond said upright and fitted against the body portion of the vehicle.

In testimony, that I claim the foregoing as my own, I have hereto affixed my signature in the presence of two witnesses.

ROSCOE D. GASTON.

Witnesses:
FRANK RUTHERFORD,
J. H. UERLING.

Copies of this patent may be obtained for five cents each, by addressing the "Commissioner of Patents, Washington, D. C."